UNITED STATES PATENT OFFICE.

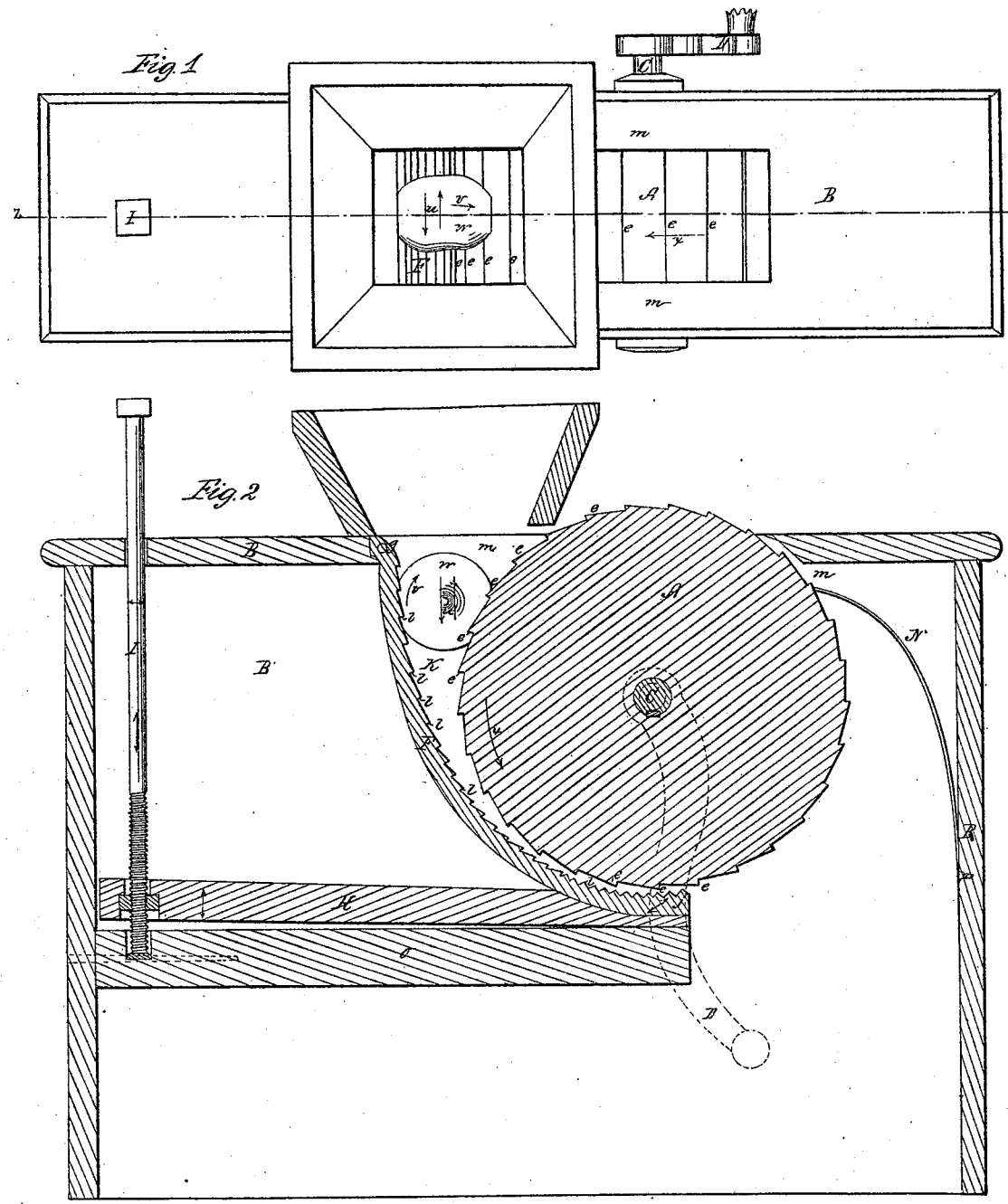

RICHARDSON P. CLARK, OF JOHNSTOWN, NEW YORK.

HAND-MILL FOR GRINDING APPLES, &c.

Specification of Letters Patent No. 25,385, dated September 13, 1859.

*To all whom it may concern:*

Be it known that I, RICHARDSON P. CLARK, of the village of Johnstown, in the county of Fulton and State of New York, have invented a new and useful Improved Hand-Mill for Reducing Apples, Potatoes, Grapes, Currants, and other Fruits and Roots to Pomace; and I do hereby declare that the following contains a full and exact description thereof, reference being had to the annexed drawings, making a part of this specification, in which—

Figure 1 is a plan, and Fig. 2 a vertical section at the line $z\ y$.

The same letters refer to like parts in both figures.

My improved hand-mill for household use in reducing apples, potatoes, and other roots and fruits to pomace, consists, essentially of a rotary cylindrical wheel or drum, A, mounted in any suitable frame, B, upon a horizontal axis, C, provided with a hand-crank, D, or an equivalent device by which the cylinder can be easily turned by hand; which cylinder, A, has its whole periphery or active surface composed of uniform, sharp, and shallow, ratchet-like teeth, $e$, which are arranged at equal distances apart, with their edges pointing in the direction (indicated by the arrow $x$) in which the cylinder turns while in action, and parallel or nearly so with its axis, and with each tooth extending entirely across the face of the cylinder, essentially as shown by the annexed drawings:—there being combined with this toothed cylinder A, a concave bed, F, which is arranged and supported in an adjustable and yielding manner—(by means of a pivot at $g$, and a loose elastic lever H, resting upon a support, $o$, and provided with an adjusting screw, I, or by equivalent means)—with one end, $i$, of the face of the concave under, and in contact or nearly so with the under side of the cylinder, and with its other end, $g$, above the level of the axis of the cylinder, and at such a distance from its surface as to freely admit the fruit or root $w$ to be reduced, into the space, K, between the cylinder and the concave; the concave being so shaped that the distance between the cylinder and concave gradually decreases from the upper to the lower end of the concave, and being of the same width as the face of the cylinder A, and having its face composed of sharp and shallow ratchet-like teeth, $l$, which are arranged farther apart near the top end, $g$, than at and near the lower end, $i$, and with their edges directed downward, or in the same direction as that in which the side of the cylinder that is next to the concave turns, and parallel or nearly so to the axis of the cylinder, and so formed that each tooth, $l$, extends entirely across the concave, the same as the teeth, $e$, reach entirely across the face of the cylinder; the ends of the space K being closed by side-boards, $m$, $m$, between and against which the ends of the cylinder turn and the edges of the concave are fitted,—the whole essentially as shown by the annexed drawings. The cylinder and concave are generally best made of cast iron; and I ordinarily arrange a spring-scraper, N, to remove what pomace may be carried up by the cylinder.

I am aware that the mere arrangement of a toothed cylinder in combination with a toothed adjustable and yielding concave within a case or curb, is not new for use as a corn-sheller or a grinding mill;—but I do not know or believe that the reducing teeth, $e$, $l$, of a cylinder and concave, when arranged and inclosed together substantially as shown by the annexed drawings, have been heretofore formed and arranged in the particular manner above described. It is this feature that constitutes the distinguishing characteristic of my invention; and thereby, a slow-moving hand-mill, for household use, with the crank on the axle of the cylinder A, is rendered peculiarly suitable for reducing apples, potatoes, and similar fruits and roots to pomace. For, when the ratchet teeth of the cylinder begin to act on the apple or root, $w$, (see Fig. 2,) the ratchet-teeth, $l$, of the upper portion of the concave, being directed downward, and also extending horizontally and entirely and straight across the concave, always reach across the whole extent of the apple, potato, beet, or other fruit or root acted upon, and therefore not only prevent the cylinder from rolling the apple or root in the direction pointed by the arrow $v$, but also tend to prevent the apple or root from being tilted sidewise in either direction indicated by the arrows $u$, (Fig. 1,) as pin-like or chisel-form or scattered teeth on the concave would allow, and, as all the sharp ratchet-teeth, $e$, of the cylinder extend horizontally and entirely across its face, they also reach entirely across whatever fruit or root is being acted on by them, and consequently do not tend to tilt or tumble the fruit or root around sidewise as scattered or pin-like teeth on the cylinder would do; but do with much certainty, successively cut or scrape off slices of the width of the fruit or root acted upon, however slow the cylinder is turned, and as the teeth of the cylinder reduce the apple or root in size, the downwardly-directed teeth, $l$, of the upper portion of the concave, allow the same to slide down, and do successively hold it from turning, until the remnant is so thin that it is crushed between the cylinder and concave and finally rubbed into pomace, the same as the successive slices that have been scraped off by the teeth of the cylinder.

My improved hand-mill also, with certainty, reduces to uniform and fine pomace, the remnants and shavings of fruit and roots made by the scraping knives $e$, of the cylinder A; for, the lower and fine-toothed or corrugated portion of the concave is held against the toothed cylinder by a yielding pressure, so that the straight teeth of the cylinder enter between the parallel teeth of the concave, and the teeth of the concave strike with a rapid chattering motion and dragging and rubbing action against the cylinder; and because the teeth of both the cylinder and concave have no such irregular spaces of various sizes between them for little bits of apple, or root to pass freely through as there are in such mills as have pin-like or scattered teeth on the cylinder and concave,—or as there would be if the teeth $e$ and $l$ did not all extend parallel with the axis of the cylinder, and entirely and straight across the active surface of the mill, and by my peculiar arrangement and construction of the teeth $e$ and $l$, I am enabled to make the constantly revolving cylinder A and its yielding concave F, perform the two distinct operations, one of cutting or scraping the apple, potato or other fruit or root into slices, and the other of rubbing the compressed slices into pomace, and since the concave F is adjustable, it may be set so as to make the shavings or parts scraped off, into either fine, or coarse pomace, or, so as to discharge them without rubbing them into pomace at all, and, as the teeth of my mill hold the apple or potato firmly to the action of the cutting teeth, I am enabled to operate it successfully by turning the cylinder slowly, as by a crank on its axis; and thus avoid the use and expense of gearing which is necessary in hand mills, with pin-like or scattered teeth, which mills, to operate successfully must be run so swift that the apples will be held to the action of the teeth by the inertia of the apples. The toothed cylinder of my mill can be easily cast in one piece; and, by my improvement, I produce, as I believe, a better hand-mill for making fruits and roots into pomace, than has been heretofore made at as cheap a rate.

What I claim as new and desire to secure by Letters Patent is—

The herein-described improved hand-mill for household use in reducing apples, potatoes, and other fruits and roots to pomace, the teeth, $e$, $l$, of the combined cylinder and adjustable and yielding concave being formed and arranged in the particular manner herein set forth.

RICHARDSON P. CLARK.

Witnesses:
 Thos. J. Cornelius,
 Austin F. Park.